(12) United States Patent  
Daniel

(10) Patent No.: US 9,174,125 B1  
(45) Date of Patent: Nov. 3, 2015

(54) SOCIAL NETWORKING GAME SYSTEM AND METHOD

(71) Applicant: Isaac S. Daniel, Miramar, FL (US)

(72) Inventor: Isaac S. Daniel, Miramar, FL (US)

( * ) Notice: Subject to any disclaimer, the term of this patent is extended or adjusted under 35 U.S.C. 154(b) by 0 days.

(21) Appl. No.: 13/621,781

(22) Filed: Sep. 17, 2012

Related U.S. Application Data

(60) Provisional application No. 61/535,516, filed on Sep. 16, 2011.

(51) Int. Cl.
| | | |
|---|---|---|
| A63F 13/40 | (2014.01) | |
| G06Q 30/02 | (2012.01) | |
| A63F 13/30 | (2014.01) | |

(52) U.S. Cl.
CPC ............. *A63F 13/10* (2013.01); *A63F 13/12* (2013.01); *G06Q 30/02* (2013.01)

(58) Field of Classification Search
USPC ........ 463/9, 10, 30–34, 39–43; 715/702–708; 273/302, 308, 292, 298, 299, 249–254
See application file for complete search history.

(56) References Cited

U.S. PATENT DOCUMENTS

| | | | | |
|---|---|---|---|---|
| 4,566,698 | A * | 1/1986 | Sneden ..................... | 273/249 |
| 7,543,819 | B2 * | 6/2009 | Cox ........................... | 273/292 |
| 8,028,022 | B2 * | 9/2011 | Brownholtz et al. ......... | 709/204 |
| 8,082,499 | B2 * | 12/2011 | Hudson et al. ............... | 715/702 |
| 2002/0198053 | A1 * | 12/2002 | Yamaoka et al. ............ | 463/42 |
| 2008/0207318 | A1 * | 8/2008 | Bailey et al. ................. | 463/31 |
| 2008/0209351 | A1 * | 8/2008 | Macadaan et al. ........... | 715/762 |
| 2010/0203936 | A1 * | 8/2010 | Levy et al. ................... | 463/4 |
| 2011/0225519 | A1 * | 9/2011 | Goldman et al. ............ | 715/757 |
| 2013/0267311 | A1 * | 10/2013 | Kumar ......................... | 463/31 |

* cited by examiner

*Primary Examiner* — Sunit Pandya

(74) *Attorney, Agent, or Firm* — Alberto Interian, III, Esq.

(57) ABSTRACT

A social networking game system that includes at least one processor, and computer executable instructions readable by the at least one processor and operative to display at least one game on a display device, wherein the game includes displaying a plurality of pictures of online social networking contacts and non-contacts, requiring that a user identify which pictures belong to contacts or non-contacts, and allowing the user to move onto a next level if the user correctly identifies which pictures belong to contacts or non-contacts.

17 Claims, 3 Drawing Sheets

SOCIAL NETWORKING GAME SYSTEM AND METHOD

PRIORITY CLAIM

The present application is a non-provisional of U.S. provisional patent application Ser. No. 61/535,516, titled "Social Networking Game System," filed on Sep. 16, 2012, by Isaac S. Daniel, whose priority is claimed and whose disclosure is hereby incorporate by reference as if fully stated herein.

FIELD

The present disclosure relates generally to computer and video games, and more specifically to games played on online social networking websites and applications.

BACKGROUND

Social networking websites, such as JUSTSYNC.com, allow users to connect with their contacts, which includes friends, family, and co-workers using technology. Users can keep up with each other's lives, send each other messages, post on each other's profiles, and play games with each other. There is an ever-increasing need for websites to make social networking more entertaining, as users grow tired of traditional social networking activities. Consequently, social networking games, such as FARMVILLE, MAFIA WARS, and the like have come about, adding an extra dimension to the social networking experience, however the demand for new and entertaining games is growing strongly.

A common issue with social networking websites is that many people have so many contacts, that they forget who their contacts are and sometimes they accept contact requests for people they do not know. A game has attempted to capitalize on this phenomenon for entertainment purposes, namely "How Many Friends Do You Know", which can be found at: http://howmanyfriendsdoyouknow.appspot.com/. This game consists of showing users a single picture of a friend at a time, and requiring that the user identify the friend by typing in the friend's exact name within a certain period of time.

This game is flawed, however, because rarely do users know both first and last names of their friends', let alone the exact spelling of both names. Furthermore, having to type in friends' names is cumbersome, and does not lend itself well to a dynamic fun online game.

SUMMARY OF PREFERRED EMBODIMENTS

The various embodiments of systems and methods disclosed herein result from the realization that the online social networking experience can be made more entertaining and engaging by providing an online social networking game that allows users to test their knowledge of their contacts and their contacts list.

DETAILED DESCRIPTION OF PREFERRED EMBODIMENTS

Figure 1A:
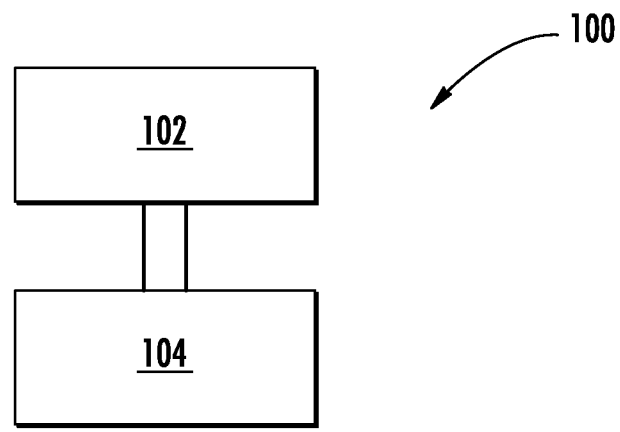
FIGS. 1A and 1B show a system in accordance with one embodiment.
Figure 1B:
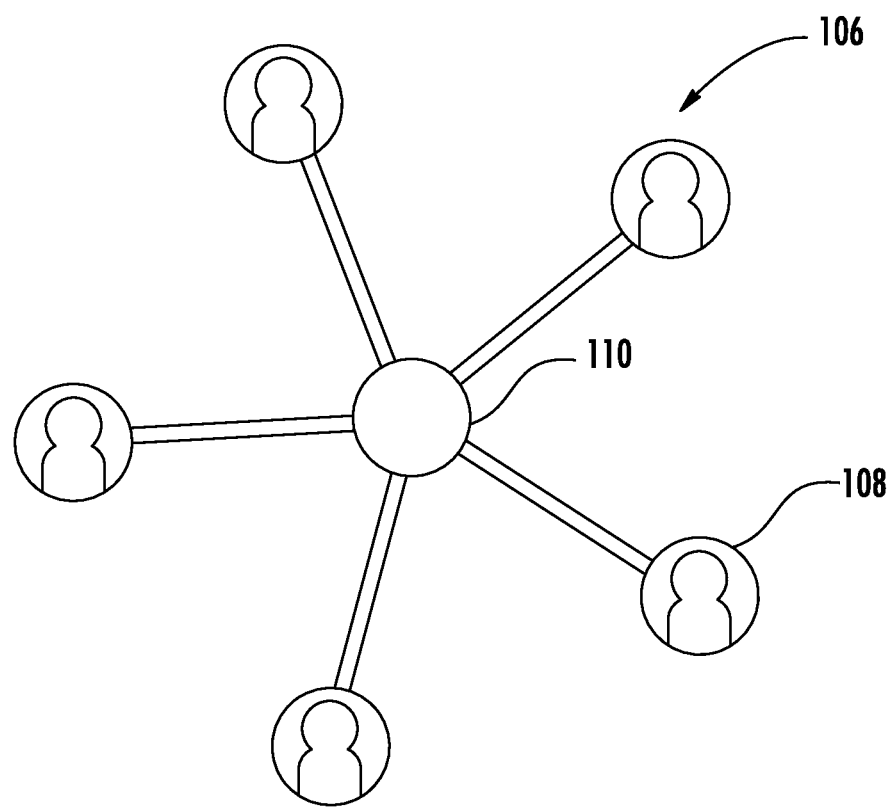

Referring now to FIGS. 1A and 1B, a system 100 is shown in accordance with one embodiment, wherein system 100 comprises at least one processor 102 and computer executable instructions readable by the at least one processor and operative to display at least one game 106 on a display device 104, wherein game 106 comprises displaying a plurality of pictures 108 of online social networking contacts and non-contacts, requiring that a user identify which pictures 108 belong to contacts or non-contacts, and allowing the user to move onto a next level if the user correctly identifies which pictures 108 belong to contacts or non-contacts.

The term "contact" as used herein may refer to any type of online social networking contact, such as friends, families, acquaintances, business connections, and even new friends or strangers.

In some embodiments, processor 102 may be any type of processor, and may reside in a client computer, such as a PC, laptop, smart phone, tablet PC, and the like, a server computer, or on a cloud computer.

In some embodiments, the display device 104 and processor 102 may be electronically connected directly, such as by local wireless or wired means, such as WLAN, Bluetooth™, USB™, Display Port, HDMI™, and the like. In an alternate embodiment, processor 102 may be indirectly or remotely electronically connected, such as through a computer network, such as the internet. In some embodiments, the terms "electronically connected" refer to any type of electronic connection, whether physical or wireless, which allows for the transmission of electrical signals.

In some embodiments, display device 104 comprises any type of display device, such as a client display device, which may be part of a PC, laptop, tablet PC, smartphone, and the like.

In a further embodiment, displaying a plurality of pictures of online social networking contacts and non-contacts comprises displaying a plurality of pictures of contacts and suggested contacts. The pictures may be profile pictures taken from the profiles of the contacts/non-contacts. The suggested contacts may be those people whom are not yet contacts of the user, but may be somehow or other connected, such as through mutual contacts. In one embodiment, the game may further prompt the user to add the suggested contacts or non-contacts to their contacts list. The prompt may be provided at any time, such as, but not limited to immediately after the user has correctly or incorrectly identified a contact or non-contact.

In some embodiments, the pictures of contacts or non-contacts may be displayed in a dynamic arrangement, such as a rotating circumferential arrangement, a dynamic matrix, which may be of any shape or size, a pop-up picture arrangement, or any other type of moving/dynamic picture presentation. The dynamic arrangement may add an extra level of difficult to the game, because users will be required to identify contacts or non-contacts from a series of moving pictures, as opposed to static pictures, however a static picture arrangement is also anticipated by the present disclosure, wherein said static arrangement may be of any shape or size.

In a further embodiment, the game may comprise a time restriction element or period, wherein the user would be required to identify the contacts/non-contacts before a particular period of time expires. The period of time may vary according to the level of difficulty of the game, which may also vary according to user progress.

In some embodiments, the user may use an input device to identify the pictures of contacts or non-contacts. The input device may be any type of input device, such as, but not limited to, a touchscreen, a mouse, a stylus, a gesture recognition device, and the like.

In some embodiments, allowing the user to move onto the next level comprises allowing the user to move onto the next level, wherein the next level comprises having to identify contacts or non-contacts during a shorter period of time and/or from a larger population of pictures. Points may be deducted or credited to the user or user account for incorrectly or correctly identifying the contacts or non-contacts.

In a further embodiment, the game may further comprise requiring that the user go down a level if they incorrectly identify the contacts or non-contacts, wherein the lower level may comprise a lower picture population (e.g. having less pictures to identify), having a longer period of time to identify contacts/non-contacts, or a combination of both.

In some embodiments, a user of a social network may be able to play the game against another user of the social network, to see who knows their contacts better. The users may challenge each other electronically over the social network, and the results of the challenge/competition may be posted to their user profiles.

In yet a further embodiment, the game may further comprise allowing the user to choose when to display the pictures and start and identification period by selecting a virtual button 110 from which pictures 108 emanate.

In another embodiment, if a user fails to recognize one of their contacts, the game may give the user the option of removing the contact they were unable to identify from their contact list.

In yet another embodiment, the game 106 may comprise using image recognition software to find pictures similar to the picture of contact 108, and then require user to determine which picture is the actual picture of contact 108. The similar pictures may be found in a database of pictures of online social networking users, or other online repository or collection of pictures, such as a search engine, and the like. The similar pictures may be pictures of non-contacts.

Figure 2:
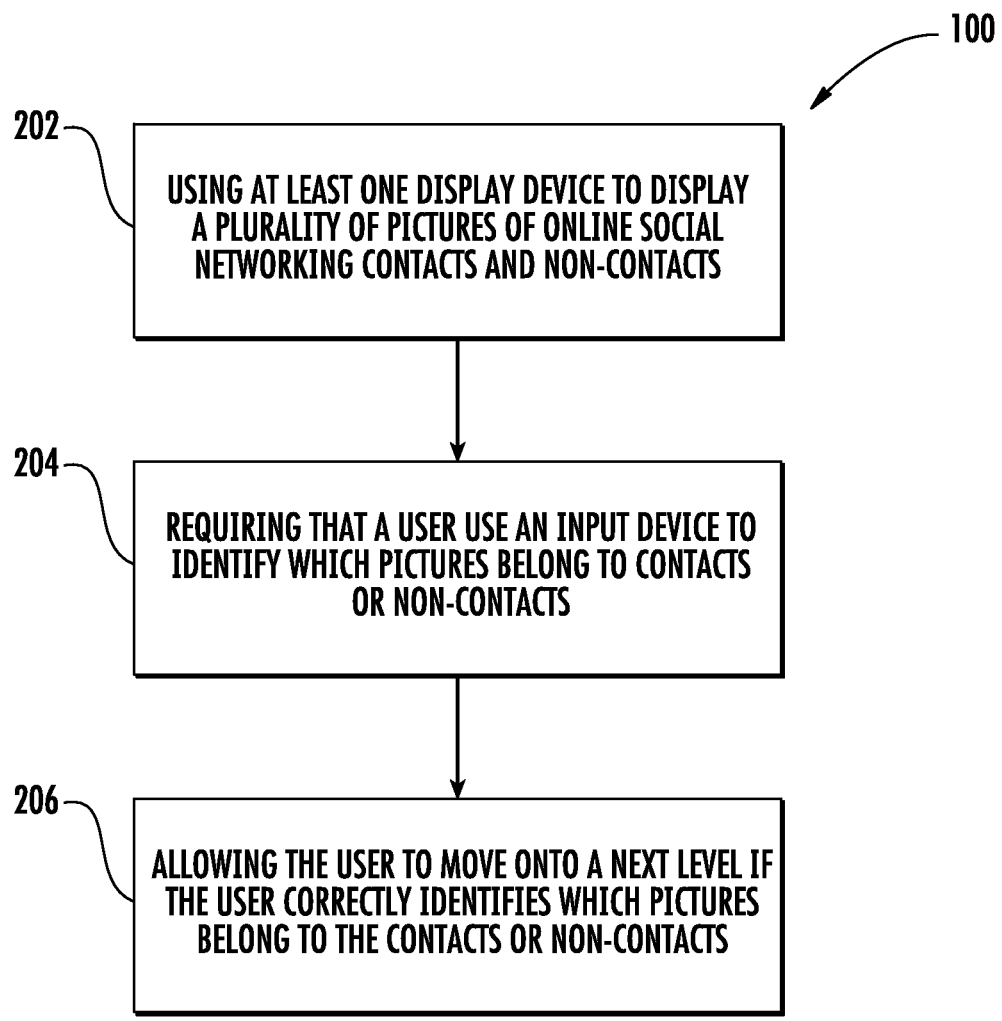
FIG. 2 shows a block diagram depicting a method in accordance with one embodiment.

Referring now to FIG. 2, a block diagram depicting a method 200 is shown in accordance with one embodiment, wherein method 200 comprises using at least one processor to perform any or all of the following: using at least one display device to display a plurality of pictures of online social networking contacts and non-contacts (block 202), requiring that a user use an input device to identify which pictures belong to contacts or non-contacts (block 204), and allowing the user to move onto a next level if the user correctly identifies which pictures belong to contacts or non-contacts (block 206).

In some embodiments, the at least one processor may reside in a client computer, such as a PC, tablet, or mobile device, a server computer, such as a social networking host or online game host computer, or on a cloud computer. The at least one processor may be any type of processor, such as those embodiments described above with reference to FIGS. 1A and 1B.

The display device may be any type of display device, such as a LCD screen, a LED screen, a projector, and the like, wherein the display device may be connected to or part of a user device. In some embodiments, the display device may be connected directly, such as by a physical wired connection or by being part of the same device, or the display device may be connected indirectly to the processor, such as via computer network.

In some embodiments, displaying a plurality of pictures of online social networking contacts and non-contacts comprises displaying a plurality of pictures of contacts and suggested contacts. Displaying a plurality of pictures of online social networking contacts and non-contacts may comprise any of those embodiments described above with reference to FIGS. 1A and 1B.

In some embodiments, requiring that a user identify which pictures belong to contacts or non-contacts comprises requiring that a user identify which pictures belong to contacts or non-contacts within a particular period of time. The contacts or non-contacts may be the user's contacts or non-contacts.

In another embodiment, allowing the user to move onto a next level if the user correctly identifies which pictures belong to contacts or non-contacts comprises allowing the user to move onto a next level, wherein the next level comprises having to identify contacts or non-contacts during a shorter period of time and/or from a larger population of pictures. In the case that the pictures are dynamic pictures, the pictures may move faster in the higher level.

In another embodiment, method 200 may further comprise using the at least one processor to require that the user go down a level if they incorrectly identify the contacts or non-contacts, wherein the lower level comprises a lower picture population, or longer period of identification time, or slower dynamic picture movement.

In some embodiments, the user may be allowed to move on to the next level or required to go back to a lower level if a user fails to or succeeds in correctly identify a certain percentage of the pictures as being contacts or non-contacts.

In some embodiments, method 200 may comprise any or all of the steps carried out by the various embodiments of system 100 described above with reference to FIGS. 1A and 1B.

Figure 3:
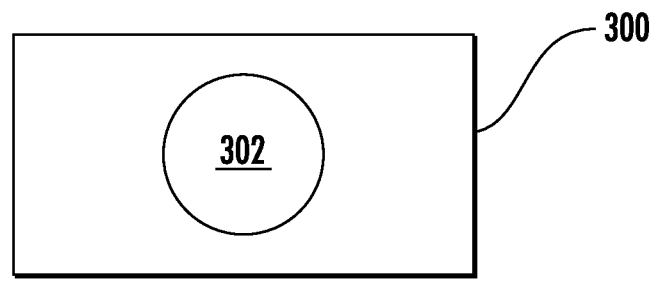
FIG. 3 shows a block diagram depicting a non-transitory computer readable medium in accordance with one embodiment.

Referring now to FIG. 3, a block diagram representing a non-transitory computer readable medium 300 is shown in accordance with one embodiment, wherein computer readable medium 300 may contain computer executable instructions 302 operative to display at least one game on a display device, wherein the game comprises displaying a plurality of pictures of online social networking contacts and non-contacts, requiring that a user identify which pictures belong to contacts or non-contacts, and allowing the user to move onto a next level if the user correctly identifies which pictures belong to contacts or non-contacts.

In some embodiments, the computer executable instructions may be operative to carry out any of the operations described above with regards to the various embodiments of system 100 and method 200 and FIGS. 1A through 2.

The non-transitory computer readable medium may comprise any type of non-transitory, non-signal computer readable medium, such as solid state computer storage, hard drives, CD-ROMs, DVDs, and the like. In another embodiment, the computer readable medium may comprise a transitory computer readable medium, such as a signal.

In the various embodiments of system and methods described herein, including system 100, method 200, and computer readable medium 300, the pictures of contacts or non-contacts may include or may be replaced with the names of those contacts or non-contacts.

Hardware and Operating Environment

This section provides an overview of exemplary hardware and the operating environments in conjunction with which embodiments of the inventive subject matter can be implemented.

A software program may be launched from a computer readable medium in a computer-based system to execute the functions defined in the software program. Various programming languages may be employed to create software programs designed to implement and perform the methods disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 4 below.

Figure 4:
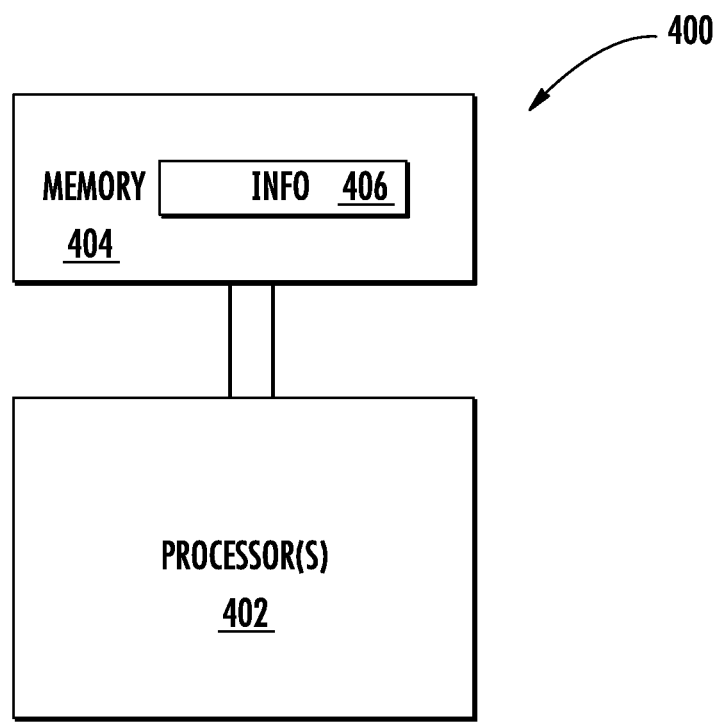
FIG. 4 shows a block diagram depicting an article in accordance with one embodiment.

FIG. 4 is a block diagram representing an article according to various embodiments. Such embodiments may comprise a computer, a memory system, a magnetic or optical disk, some other storage device, or any type of electronic device or system. The article 400 may include one or more processor(s) 402 coupled to a machine-accessible medium such as a memory 404 (e.g., a memory including electrical, optical, or electromagnetic elements). The medium may contain associated information 406 (e.g., computer program instructions, data, or both) which, when accessed, results in a machine (e.g., the processor(s) 402) performing the activities previously described herein.

The principles of the present disclosure may be applied to all types of computers, systems, and the like, include desktop computers, servers, notebook computers, personal digital assistants, microcomputers, and the like. However, the present disclosure may not be limited to the personal computer.

While certain novel features of this invention have been shown and described and are pointed out in the annexed claims, it is not intended to be limited to the details above, since it will be understood that various omissions, modifications, substitutions and changes in the forms, method, steps and system illustrated and in its operation can be made by those skilled in the art without departing in any way from the spirit of the present invention.

The invention claimed is:

1. A social networking game system comprising:
at least one processor; and
computer executable instructions readable by the at least one processor and operative to display at least one game on a display device, wherein the game comprises:
enabling the display device for displaying a display of a plurality of pictures of a user's online social networking contacts and suggested contacts taken from the user's or suggested contacts' profile and of persons who are not the user's online social networking contacts wherein displaying of the pictures of persons who are not the user's online social networking contacts includes using image recognition software for displaying pictures of persons that look like the user's online social networking contacts found in a database of pictures of online social networking users, other online repository or collection of pictures, such as a search engine;
enabling the display device to present the plurality of pictures to enable user interaction with the plurality of pictures requiring a determining by the user as to which of the plurality of pictures are identifiable from the user's social networking contacts or which of the plurality of pictures are not of the user's social networking contacts; and
enabling the display to present the plurality of pictures in a shorter period of time or from a larger population of pictures from which user's successful interaction allows the user to move onto a next level if the user correctly identifies which pictures are of the user's social networking contacts or are not of the user's online social networking contacts.

2. The social networking game system of claim 1, wherein the computer executable instructions are operative to allow the user to remove a social networking contact if the user was unable to identify the picture of the contact.

3. The social networking game system of claim 1, wherein the plurality of pictures comprise social networking profile pictures.

4. The social networking game system of claim 1, wherein displaying a plurality of pictures of the user's online social networking contacts and of persons who are not the user's online social networking contacts comprises displaying a dynamic arrangement of pictures of the user's online social networking contacts and of persons who are not the user's online social networking contacts.

5. The social networking game system of claim 1, wherein requiring that a user identify which pictures are of the user's online social networking contacts or which of the plurality of pictures are not of the user's social networking contacts comprises requiring that a user identify which pictures are of the user's online social networking contacts or which of the plurality of pictures are not of the user's social networking contacts within a particular period of time.

6. The social networking game system of claim 1, wherein allowing the user to move onto a next level if the user correctly identifies which pictures are of the user's social networking contacts or are not of the user's online social networking contacts comprises allowing the user to move onto a next level, wherein the next level comprises having to identify the user's social networking contacts or persons who are not the user's online social networking contacts during a shorter period of time and/or from a larger population of pictures.

7. The social networking game system of claim 1, wherein the computer executable instructions are further operative to deduct or credit points to the user for incorrectly or correctly identifying the user's social networking contacts or persons who are not the user's online social networking contacts.

8. The social networking game system of claim 1, wherein the computer executable instructions are further operative to require that the user go down a level if the user incorrectly identifies the user's social networking contacts or persons who are not the user's online social networking contacts, wherein the lower level comprises a lower picture population, or longer period of identification time.

9. The social networking game system of claim 1, wherein the computer executable instructions are further operative to allow the user to choose when to display the pictures and start an identification period by selecting a virtual button from which the pictures emanate.

10. The social networking game system of claim 1, wherein the computer executable instructions are operative to prompt the user to add the persons who are not the user's social networking contacts to the user's social networking contact list.

11. A social networking game method comprising:
using at least one processor to perform any or all of the following:
enabling at least one display device for displaying a display of a plurality of pictures of a user's online social networking contacts and suggested contacts taken from the user's or suggested contacts' profile, and of persons who are not the user's online social networking contacts;

enabling the at least one display device to present the plurality of pictures to enable user interaction with the plurality of pictures requiring that the user use an input device in determining which of the plurality of pictures are identifiable from the user's social networking contacts or which of the plurality of pictures are not of the user's social networking contacts; and enabling the display to present the plurality of pictures in a shorter period of time or from a larger population of pictures from which user's successful interaction allows the user to move onto a next level if the user correctly identifies which pictures are of the user's social networking contacts or are not of the user's online social networking contacts.

12. The social networking game method of claim 11, further comprising allowing the user to remove a social networking contact if the user was unable to identify the picture of the contact.

13. The social networking game method of claim 11, wherein displaying a plurality of pictures of the user's online social networking contacts and of persons who are not the user's online social networking contacts comprises displaying a dynamic arrangement of pictures of the user's online social networking contacts and of persons who are not the user's online social networking contacts.

14. The social networking game method of claim 11, wherein requiring that a user identify which pictures are of the user's online social networking contacts or which of the plurality of pictures are not of the user's social networking contacts comprises requiring that a user identify which pictures are of the user's online social networking contacts or which of the plurality of pictures are not of the user's social networking contacts within a particular period of time.

15. The social networking game method of claim 11, wherein allowing the user to move onto a next level if the user correctly identifies which pictures are of the user's social networking contacts or are not of the user's online social networking contacts comprises allowing the user to move onto a next level, wherein the next level comprises having to identify the user's social networking contacts or persons who are not the user's online social networking contacts during a shorter period of time and/or from a larger population of pictures.

16. The social networking game method of claim 11, further comprising using the at least one processor to require that the user go down a level if the user incorrectly identifies the user's social networking contacts or persons who are not the user's online social networking contacts, wherein the lower level comprises a lower picture population, or longer period of identification time.

17. A non-transitory computer readable medium containing computer executable instructions operative to display at least one game on a display device, wherein the game comprises:

enabling the display device for displaying a display of a plurality of pictures of online social networking contacts and suggested contacts, and non-contacts taken from the user's or suggested contacts' profile;

enabling the display device to present the plurality of pictures to enable user interaction with the plurality of pictures requiring a determining by the user as to which of the plurality of pictures belong to the user's social networking contacts or which of the plurality of pictures are not of the user's social networking contacts; and enabling the display to present the plurality of pictures in a shorter period of time or from a larger population of pictures from which user's successful interaction allows the user to move onto a next level if the user correctly identifies which pictures belong to the user's social networking contacts or are not of the user's online social networking contacts.

\* \* \* \* \*